May 18, 1937. F. N. ROSS 2,080,545
CLINCH-ON NUT
Filed April 4, 1935 Sheets-Sheet 1
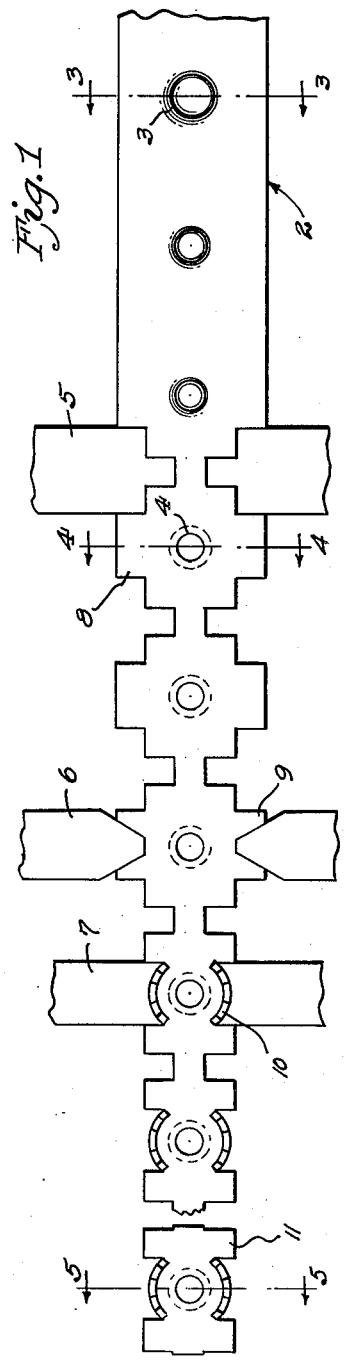
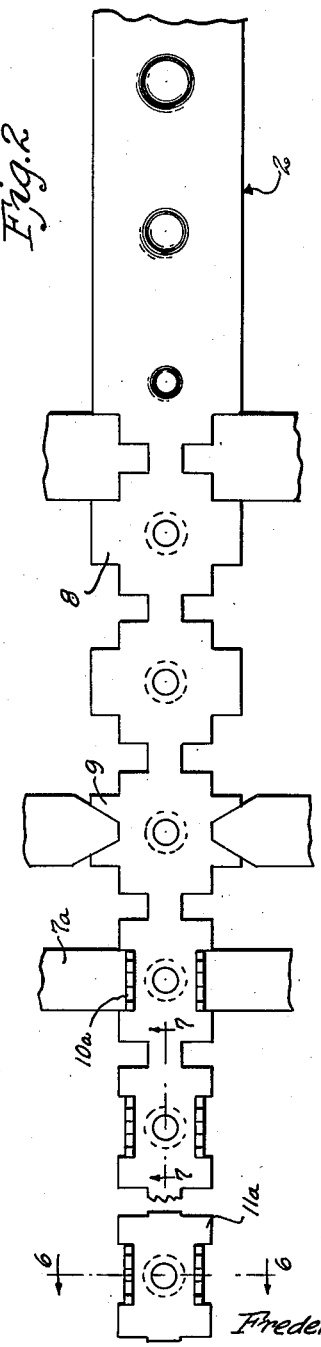
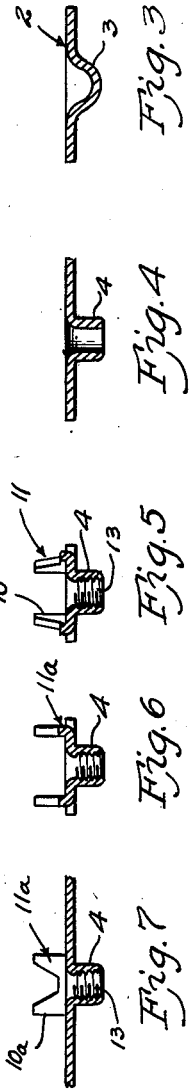
INVENTOR.
Frederick N. Ross
BY
Barnes, Kisselle, Laughlin & Raisch
ATTORNEYS May 18, 1937.   F. N. ROSS   2,080,545
CLINCH-ON NUT
Filed April 4, 1935   2 Sheets-Sheet 2
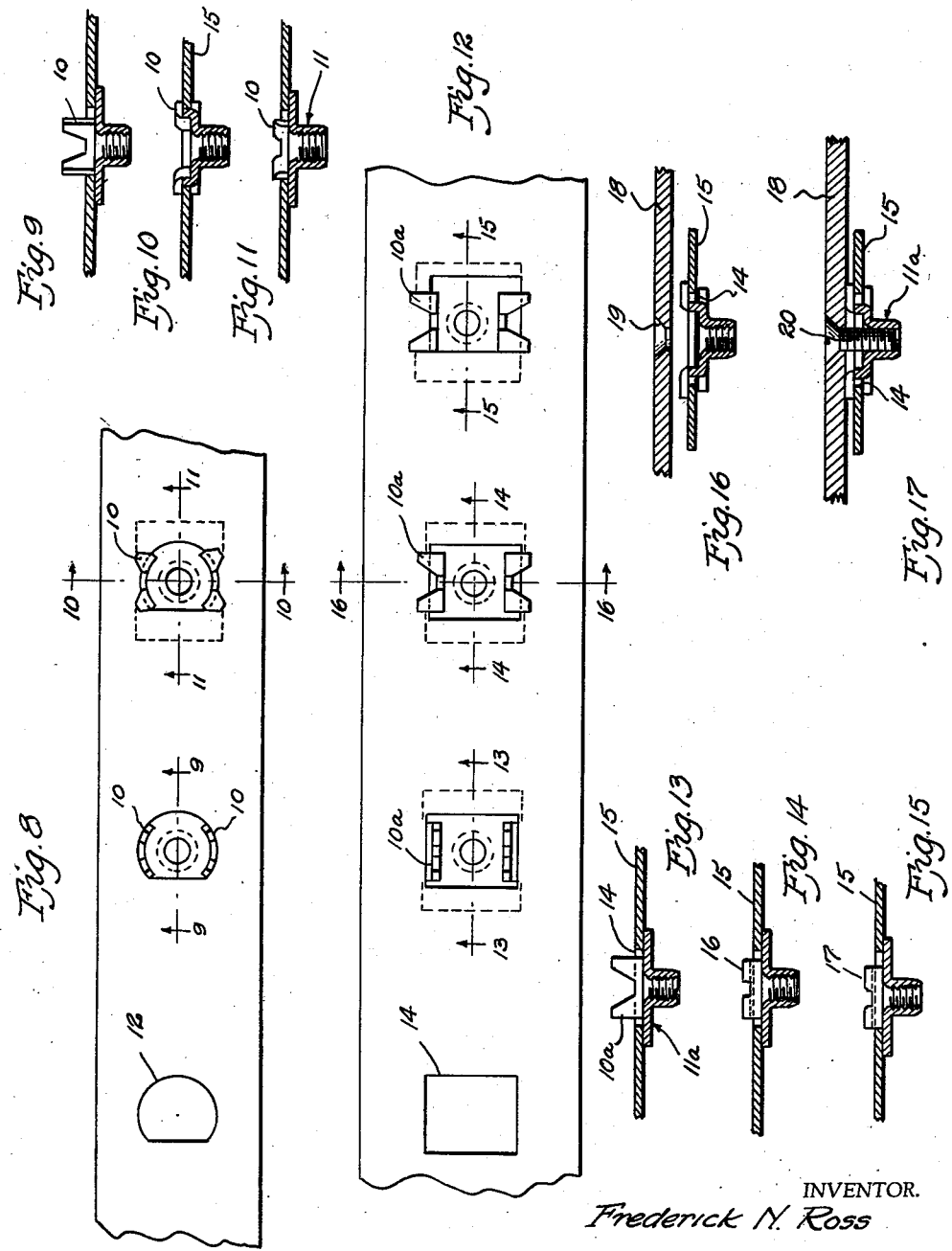
INVENTOR.
Frederick N. Ross
BY
Barnes, Kisselle, Laughlin & Raisch
ATTORNEYS Patented May 18, 1937

2,080,545

UNITED STATES PATENT OFFICE 2,080,545

CLINCH-ON NUT

Frederick N. Ross, Detroit, Mich., assignor to F. L. McLaughlin Company, Detroit, Mich., a corporation of Michigan Application April 4, 1935, Serial No. 14,688

7 Claims. (Cl. 85—32)

This invention relates to a clinch-on nut, and has to do particularly with a compact, integral nut unit and the clinching of the same in position.

Clinch-on nuts of the prior art have been generally of three different types; one type embodying an integral machine screw nut unit of D shape, and requiring a considerable amount of expensive machining; another type of which the clinch-on part of the nut is of sheet metal and the nut itself is of standard form and enclosed within the sheet metal, and a third type wherein the nut is formed by punch press operation from an integral blank.

The present invention has to do with clinch-on nuts which generally may be said to be an improvement upon the third type; one of the main features of the improvement being that the nut is completely fabricated from sheet metal; this includes several novel steps in the forming and fabrication of each clinch-on nut unit.

The invention further contemplates a clinch-on nut in which the nut portion is formed by extruding and tapping flat sheet metal and in which the ear portions are stamped away from the flat stock so that a portion of the flat stock forms a base and contacts with one side of the sheet metal surface and the ears form the nonturning members which pass through and clinch on the other side of the sheet metal surface. These ears are such that they may accommodate different types of apertures formed in the sheet metal articles which are to be clamped together. In most cases the clinching is such that there is positive floating or free play between the nut and the sheet metal article; in other cases the floating is impossible due to the necessary type of the aperture. The ears or prongs of the nut are such that it may be assembled in the aperture in different positions thus saving, on an average, about half the time required when the clinch-on nut is made only to fit the aperture in one certain position.

Other features have to do with details of structure, initial fabrication and final assembly, as will be more clearly set forth in the specification and claims.

In the drawings:

Fig. 1 illustrates a method of fabrication of the complete clinch-on nut unit from flat strip stock and illustrates the various operations from the flat sheet to the formed article.

Fig. 2 is a view similar to Fig. 1 but illustrating the manner of forming the nut when it is designed to fit into a square or rectangular hole.

Figs. 3 to 7 are detail sectional views taken on lines 3—3 to 7—7 of Figs. 1 and 2, Figs. 3 and 4 representing the same section of both Figs. 1 and 2 and Figs. 5 and 6 illustrating the difference in the manner of forming the prongs or ears when it is designed for a circular D shaped opening and a square rectangular opening.

Fig. 8 illustrates the manner of assembling the clinch-on nut of the type shown in Fig. 1 in a D shaped hole.

Figs. 9, 10 and 11 are detail sectional views taken on lines 9—9, 10—10, and 11—11 of Fig. 8.

Fig. 12 is a view similar to Fig. 8 illustrating the manner of assembling the nut as shown in Fig. 2 as a floating nut within a square rectangular hole.

Figs. 13 to 16 are sectional views taken on lines 13—13 to 16—16 of Fig. 12.

Fig. 17 is a view similar to Fig. 16 illustrating the manner of tightening the clinch-on nut as two adjacent sheet metal parts are drawn together.

One of the important features of the present invention is the forming of the nut from flat strip stock and in Fig. 1 I have shown such a strip of stock as at 2, the thickness of which is illustrated in the enlarged Fig. 3. It will be understood that Fig. 1 is also considerably enlarged, about double size. The width of the strip 2 is such as to be wide enough to make the ears of the nut, as will be subsequently described, so that there is very little waste in the fabrication of the nut.

In fabricating the nut the forming operations are similar but successive in action, as will be readily understood by those skilled in the art. The operations are largely stamping operations and start with the embossing or drawing out of the portions 3 and 4, which portions subsequently form the threaded body portion of the nut. Tools such as shown at 5, 6 and 7 are more or less diagrammatic and it will be understood that the various nut sections 8 are blanked out, the ears successively formed as at 9 and shaped and bent over as at 10 so as to form the final nut 11 which is cut off from the rest of the strip.

The ears 10, as best shown in Fig. 1, are spaced from each other in circular or arcuate alignment. The reason for this is that in many sheet metal constructions the sheet metal which is to be secured together by the clinch-on nuts is provided with D shaped holes 12. By making the prongs 10 circular in their longitudinal spaced alignment it is possible to pick up the clinch-on nut at substantially any position and assemble it within the D shaped hole. In any case, at least two separate positions, at least 180° apart, are possible. This permits the operator to pick up and assemble the nut without the waste of a lot of time in finding a flat surface which corresponds to the flat surface of the D. After insertion, the ears 10 are clinched over, as shown at the right hand end of Fig. 8.

The embossed or extruded portion 4, as shown in Fig. 4, may be readily tapped as shown at 13 in Fig. 5. This tapping may be accomplished at practically any step in the fabrication of the nuts. This forming of the housing portion 14 by embossing or extruding the same from a flat strip during the successive stamping operations of forming the nut limits the drilling step, but what is more important, it makes possible the fabrication of the complete nut, including the threaded portion, from a single thin strip of sheet metal, thus materially reducing the cost of this type of clinch-on nut and making the same easy to handle and relatively easy to assemble.

In fabricating the nut by the method illustrated in Fig. 2 the steps are substantially identical with that shown in Fig. 1 with the exception that the tool 7a is such as to position the prongs 10a on each side of the nut substantially parallel with each other; in other words, so that they will enter a rectangular aperture.

Although the arcuate prong type of nut, as illustrated in Figs. 1 to 8, may be fabricated so as to have a floating fit with one of the sheet metal surfaces to be clamped together, its most efficient form would be a rather close fit, as indicated in Figs. 8 to 11. However, in the form of nut as shown at 11a in Figs. 2 and 7, the prongs are adapted to fit within a rectangular or square opening such as shown at 14 in Fig. 12. The length and width of the rectangle defined by the prongs 10a extending at right angles to the plane of the nut is designed to be less in dimensions than the rectangle 14 into which the nut fits. This is best illustrated in Figs. 13 and 14. The prongs 10a are preferably turned over in such a manner that the nut 11a is still loose or still has a floating relationship to the sheet metal strip 15 to which the nut is adapted to be attached. Thus, after the clinch-on nut has been clinched in position upon the strip 15 it can be centered as shown at 16, Fig. 14, or it can be moved to one side or the other as shown at 17 in Fig. 15. The various positions are also illustrated in plan view as shown in Fig. 12.

Now when the adjacent sheets of metal 15 and 18 are to be secured together by means of the clinch-on nuts, it will be seen that even though the aperture 19 in the sheet 18 may be considerably out of alignment with the axis of the aperture 14, the floating relationship of the nut 11a within the aperture 14 is such as to permit the nut to align itself with the axis of the bolt aperture 19. The bolt 20 may then be easily inserted into position without undue strain or binding and the clinch-on nut 11a will center itself within the aperture 14 in the plate 15. As the two plates 15 and 18 are drawn together by tightening the screw, it will be seen that the nut will be gradually tightened relative to the plate 15 so that it is no longer floating but there is a binding engagement with respect to the two plates 15 and 18, the nut and the bolt. The direct result of this type of nut and method of assembly is that it accommodates itself to misaligning of the aperture and respective plates which are to be fastened together, but what is more important, it eliminates squeaking in all-metal automobile bodies which has heretofore been largely due to the strain placed upon the two sheet metal parts where the respective apertures have been out of alignment.

What I claim is:

1. In a clinch-on nut formed of sheet metal comprising a base portion adapted to contact with one side of a sheet of metal to be secured in position against a second sheet of metal carrying a bolt, said first named sheet of metal having an aperture, ears extending inwardly from said base portion through said aperture adapted to be distorted to clinch the nut in position, and an extruded threaded portion extending outwardly from said base portion adapted to receive the threads of a bolt protruding through said second sheet of metal to secure said apertured sheet of metal, said ears being positioned to contact with the sheet of metal carrying said bolt.

2. A clinch-on nut formed of sheet metal comprising a base portion adapted to contact with one side of a sheet of metal to be secured in position against a second sheet of metal carrying a bolt, said first named sheet of metal having an aperture, ears extending inwardly from said base portion through said aperture adapted to be distorted to clinch the nut in position, and an extruded threaded portion extending outwardly from said base portion adapted to receive the threads of a bolt carried by said second sheet of metal to secure said apertured sheet of metal, said inwardly extending ears being bifurcated from the sheet of metal forming the nut, and said ears being positioned to contact with the sheet of metal carrying said bolt.

3. A clinch-on nut formed of sheet metal comprising a base portion adapted to contact with one side of a sheet of metal to be secured in position, said sheet of metal having an aperture with one surface thereof flattened, ears extending inwardly from said base portion through said aperture adapted to be distorted to clinch the nut in position, and an extruded threaded portion extending outwardly from said base portion adapted to receive the threads of a bolt to secure said sheet of metal, said inwardly extending ears being so positioned that said nut may be inserted in said aperture in a plurality of different positions and still contact with said flattened surface to prevent turning of the nut when clinched in position.

4. A clinch-on nut formed of sheet metal comprising a base portion adapted to contact with one side of a sheet of metal to be secured in position, said sheet of metal having a D shaped aperture with one surface thereof flattened, ears extending inwardly from said base portion through said aperture adapted to be distorted to clinch the nut in position, and an extruded threaded portion extending outwardly from said base portion adapted to receive the threads of a bolt to secure said sheet of metal, said inwardly extending ears being arranged concentrically about the axis of said nut whereby the nut may be inserted in said aperture in a plurality of positions.

5. A clinch-on nut formed of sheet metal comprising a base portion adapted to contact with one side only of a sheet of metal, said sheet of metal having an aperture, ears extending inwardly from said base portion through said aperture, said ears being of less dimensions than the aperture and being turned over only a sufficient amount as to permit free relative movement between the nut and the sheet of metal in any direction in the same plane, and a threaded portion extending outwardly from said base member for receiving a bolt to tighten the nut against the sheet of metal after alignment of the nut member.

6. A clinch-on nut formed of sheet metal comprising a base portion adapted to contact with one side only of a sheet of metal, said sheet of metal having an aperture, ears extending inwardly from said base portion through said aperture, said ears being of less dimensions than the aperture and being turned over only a sufficient amount as to permit free relative movement between the nut and the sheet of metal in any direction in the same plane, and an extruded threaded portion extending outwardly from said base member for receiving a bolt to tighten the nut against the sheet of metal after alignment of the nut member.

7. As a new article of manufacture, a sheet metal clinch-on nut adapted to be permanently clamped in an aperture in a sheet metal plate, comprising a base portion and ear members and an extruded threaded portion extending from said base portion in opposite directions.

FREDERICK N. ROSS.